US007990882B1

(12) United States Patent
Bedair et al.

(10) Patent No.: US 7,990,882 B1
(45) Date of Patent: Aug. 2, 2011

(54) ADAPTIVELY MAINTAINING QUALITY OF SERVICE (QOS) IN DISTRIBUTED PBX NETWORKS

(75) Inventors: Ayman Bedair, Nepean (CA); Zlatan Dedic, Belleville (CA); Andre M. Cyr, Belleville (CA)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 09/475,269

(22) Filed: Dec. 30, 1999

(51) Int. Cl.
 *H04J 3/16* (2006.01)
(52) U.S. Cl. ......................................... 370/252; 370/468
(58) Field of Classification Search .................. 370/235, 370/468, 474
See application file for complete search history.

(56) References Cited

U.S. PATENT DOCUMENTS

| | | | |
|---|---|---|---|
| 4,440,986 A * | 4/1984 | Thorson | 379/290 |
| 5,361,259 A | 11/1994 | Hunt et al. | |
| 5,479,407 A | 12/1995 | Ko et al. | |
| 5,638,363 A | 6/1997 | Gittins et al. | 370/358 |
| 5,694,390 A * | 12/1997 | Yamato et al. | 370/230 |
| 5,699,356 A | 12/1997 | Beever et al. | |
| 5,726,985 A * | 3/1998 | Daniel et al. | 370/382 |
| 5,793,976 A | 8/1998 | Chen et al. | 370/351 |
| 5,875,234 A | 2/1999 | Clayton et al. | |
| 5,896,442 A | 4/1999 | Song et al. | |
| 5,912,894 A * | 6/1999 | Duault et al. | 370/433 |
| 5,953,338 A * | 9/1999 | Ma et al. | 370/395.21 |
| 6,014,431 A | 1/2000 | McHale et al. | |
| 6,031,845 A | 2/2000 | Walding | |
| 6,038,237 A | 3/2000 | Tsuruta et al. | |
| 6,058,181 A | 5/2000 | Hebert | |
| 6,134,313 A | 10/2000 | Dorfman et al. | |
| 6,198,725 B1 * | 3/2001 | Constantin et al. | 370/395.21 |
| 6,263,371 B1 * | 7/2001 | Geagan et al. | 709/231 |
| 6,275,510 B1 | 8/2001 | Koenig et al. | |
| 6,285,751 B1 | 9/2001 | Robinson | |
| 6,304,567 B1 | 10/2001 | Rosenberg | |
| 6,343,086 B1 | 1/2002 | Katz et al. | |
| 6,351,452 B1 | 2/2002 | Koenig et al. | |
| 6,356,545 B1 | 3/2002 | Vargo et al. | |
| 6,370,117 B1 | 4/2002 | Koraitim et al. | |
| 6,374,112 B1 * | 4/2002 | Widegren et al. | 455/452.2 |
| 6,385,192 B1 | 5/2002 | Kozdon et al. | |
| 6,389,005 B1 * | 5/2002 | Cruickshank | 370/352 |
| 6,400,711 B1 | 6/2002 | Pounds et al. | |
| 6,452,944 B1 | 9/2002 | Appanna et al. | |
| 6,459,708 B1 | 10/2002 | Cox et al. | |
| 6,519,259 B1 | 2/2003 | Baker et al. | |
| 6,614,811 B1 | 9/2003 | Alaimo et al. | |
| 6,665,264 B1 | 12/2003 | Davison et al. | |

(Continued)

FOREIGN PATENT DOCUMENTS

EP 0 772 370 5/1997
(Continued)

OTHER PUBLICATIONS

European Search Report dated Aug. 17, 2001.
(Continued)

*Primary Examiner* — Kevin C Harper
(74) *Attorney, Agent, or Firm* — Withrow & Terranova, PLLC

(57) ABSTRACT

An adaptation mechanism monitors, maintains and controls quality of voice-grade for communications among end-systems in a distributed PBX topology, thereby providing an enhanced Quality of Service (QoS) for the network.

30 Claims, 13 Drawing Sheets

U.S. PATENT DOCUMENTS

| | | | |
|---|---|---|---|
| 6,683,887 B1 | 1/2004 | Huang et al. | |
| 6,850,764 B1 | 2/2005 | Patel | |
| 7,236,483 B2 | 6/2007 | Yeom | |
| 7,263,095 B1 | 8/2007 | Sarkar | |
| 7,272,134 B2 | 9/2007 | Iwama et al. | |
| 7,373,422 B1 | 5/2008 | Paul et al. | |
| 7,430,179 B2 | 9/2008 | Towns-von Stauber et al. | |
| 2002/0101860 A1 | 8/2002 | Thornton et al. | |
| 2002/0176406 A1 | 11/2002 | Tsukada et al. | |
| 2003/0091028 A1* | 5/2003 | Chang et al. | 370/352 |
| 2003/0140159 A1* | 7/2003 | Campbell et al. | 709/231 |
| 2003/0189938 A1* | 10/2003 | Beshai | 370/396 |
| 2003/0214928 A1* | 11/2003 | Chuah | 370/336 |
| 2006/0015639 A1 | 1/2006 | Taylor | |
| 2006/0098625 A1 | 5/2006 | King et al. | |
| 2006/0146859 A1 | 7/2006 | Baldwin et al. | |
| 2006/0268678 A1 | 11/2006 | Dhesikan et al. | |
| 2007/0019563 A1 | 1/2007 | Ramachandran et al. | |

FOREIGN PATENT DOCUMENTS

| | | |
|---|---|---|
| EP | 0 835 038 | 4/1998 |
| EP | 0 944 289 | 9/1999 |
| JP | 09 261231 | 10/1997 |
| WO | WO92/21188 | 11/1992 |
| WO | WO97/32448 | 9/1997 |

OTHER PUBLICATIONS

Morita, S., et al., "Elastic Basket Switching Application to Distributed PBX," Proceedings of IEEE International Conference on Communications, Seattle, WA, Jun. 7-10, 1987, vol. 2, pp. 789-793.

* cited by examiner

ADAPTIVELY MAINTAINING QUALITY OF SERVICE (QOS) IN DISTRIBUTED PBX NETWORKS

RELATED APPLICATIONS

The following identified U.S. patent applications are relied upon and are incorporated by reference in their entirety in this application:

U.S. patent application Ser. No. 09/474,779 entitled "SYSTEM AND METHOD FOR NETWORK BANDWIDTH OPTIMIZATION IN ACCORDANCE WITH CARD DETECTION," filed on Dec. 30, 1999 by Ayman Bedair, et al.; and U.S. patent application Ser. No. 09/474,778 entitled "SYSTEM AND METHOD FOR NETWORK BANDWIDTH OPTIMIZATION IN ACCORDANCE WITH ACTIVE COMMUNICATION DETECTION," filed on Dec. 30, 1999 by Ayman Bedair, et al.

BACKGROUND OF THE INVENTION

A. Field of the Invention

The present invention relates to an adaptation mechanism which can be used to monitor, maintain and control quality of voice-grade for communications among end-systems in a distributed PBX topology, thereby providing an enhanced Quality of Service (QoS) for the network.

B. Description of the Related Art

Recently, many efforts have been devoted by the Internet community to investigate transport mechanisms capable of guaranteeing Quality of Service (QoS) requirements for datagram networks (such as, for example, Internet Protocol (IP) networks). The objectives include alternatives to the transport of voice, video and multimedia by classic Telephone/ISDN and ATM networks. The basic problem is how to guarantee bandwidth, latency (delay) and packet loss, required by voice and video, in datagram network architecture.

Communication links between PBXs require a fairly large bandwidth for operation on data networks. Maintaining this amount of bandwidth is expensive and often results in degradation in the overall quality of service among all applications running on the network. Known solutions to the problem include attempting to reserve bandwidth using approaches such as Resource reSerVation Protocols (RSVP) or policy management systems.

In addition, approaches to maintaining voice quality, such as setting up a fixed Packet Delay Variation (PDV) buffer size is not ideally suited to Internet Protocol (IP) Networks in which messages flow in a bursty, rather than uniform, manner. If the buffer size is too small, the most recently arriving data will overflow and the preceding data is lost. If the buffer is too large, there will be gaps, resulting in breaks between message packets. Attempts to set the buffer size at periodic intervals is a tedious process due to the redundancy of the traffic flow, and is usually based on trial and error.

Until now, the main obstacle to implementation of an adaptable QoS monitoring mechanism from an application prospect has been the manner in which measurements are obtained. Several algorithm-based solutions have been proposed, including using the Internet Control Message Protocol (ICMP). This, however, has been shown to produce not very accurate measurements, has real-time impact on performance of the system, and adds more traffic to the network. The added traffic overhead is directly proportional to the level of accuracy being sought for the measurements.

Moreover, many real-time operating systems (RTOS) do not support multiple applications which use raw sockets (used mainly for ICMP). This usually results in interference between applications attempting to use the sockets.

Nor is using the Transmission Control Protocol (TCP) or the User Datagram Protocol (UDP) always acceptable, since these protocols add overhead onto both end systems, represented by the need to create at least one process on each end machine to simulate the functionality of the ICMP. Furthermore, processing time is added on because raw sockets interact directly with the network layer and other types of sockets interact with the upper layers of the IP stacks. This in turn results in inaccuracy in the sending and arrival time of messages. Furthermore, as in the case of ICMP, traffic is added to the network.

SUMMARY OF THE INVENTION

Systems and methods consistent with the present invention add intelligence to systems such as PBXs connected to a data network to react to changes in network conditions permitting communication links to quickly adapt to those conditions without the need for manual intervention and to reduce the impact of such systems on the network, thereby enhancing overall system performance.

Methods and systems consistent with the present invention are provided for monitoring the quality of data networks and dynamically adapting its behavior in accordance with the condition of the network to maintain QoS.

It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate an implementation of the invention and, together with the description, serve to explain the principles of the invention.

DETAILED DESCRIPTION

Reference will now be made in detail to the construction and operation of an implementation of the present invention which is illustrated in the accompanying drawings. The present invention is not limited to this implementation but it may be realized by other implementations.

A. Overview

Systems and methods consistent with the invention provide an adaptation mechanism which can be utilized to monitor, maintain and control the quality of voice-grade communications among end-systems in a distributed Private Branch eXchange (PBX) topology. Basically, incoming information from a data network is used to alter the behavior of a system and adjust the system's transmissions to the network. Such a communication link is able to adapt rapidly to changing conditions in the network without manual intervention, thereby quickly enhancing the overall system performance.

Figure 1:
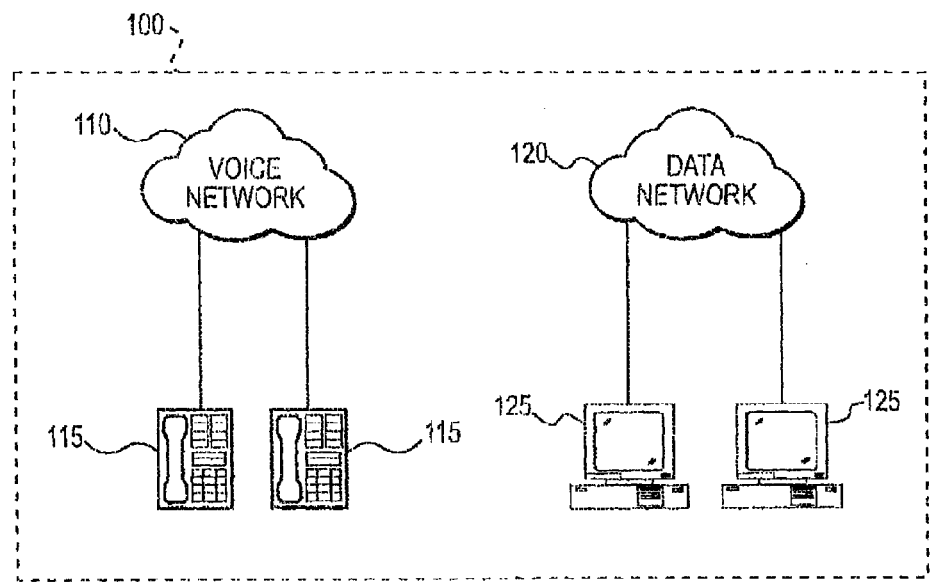
FIG. 1 illustrates a prior communication system including separate voice and data networks.

As shown in FIG. 1, a communication system 100 for an entity, such as a corporation, office, or home, would include a voice network 110, such as a private branch exchange (PBX), or a group of PBX's connected with each other or to a central office, and a data network 120, such as computers 125 connected to each other over an Intranet and to the Internet. PBX 110 is a network that allows many voice devices 115 to share a lesser number of outside lines (e.g., trunk lines) for making external voice calls. Internal wiring in PBX 110 permits users within the entity to contact each other without sending information outside of the entity.

Figure 2:
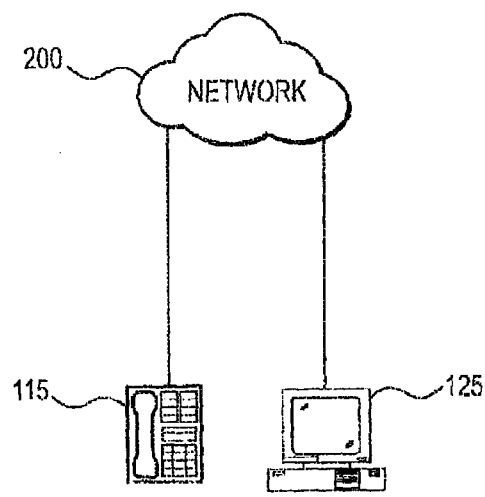
FIG. 2 illustrates a high level diagram of a system having a combined voice and data network.

As shown in FIG. 2, an entity may wish to connect voice devices 115 and computers 125 on a single network 200 for communication internally and externally to the Internet. In other words, voice network 110 and data network 120 would merge into a single network 200. Typically, network 200 digitizes the data from the voice devices into, for example, G.711 format, and sends all digital data, including the voice traffic, over network 200. In other words, network 200 would use the same manner of transmission between computers 125 and add additional processing to transmit data from the voice devices.

Figure 3:
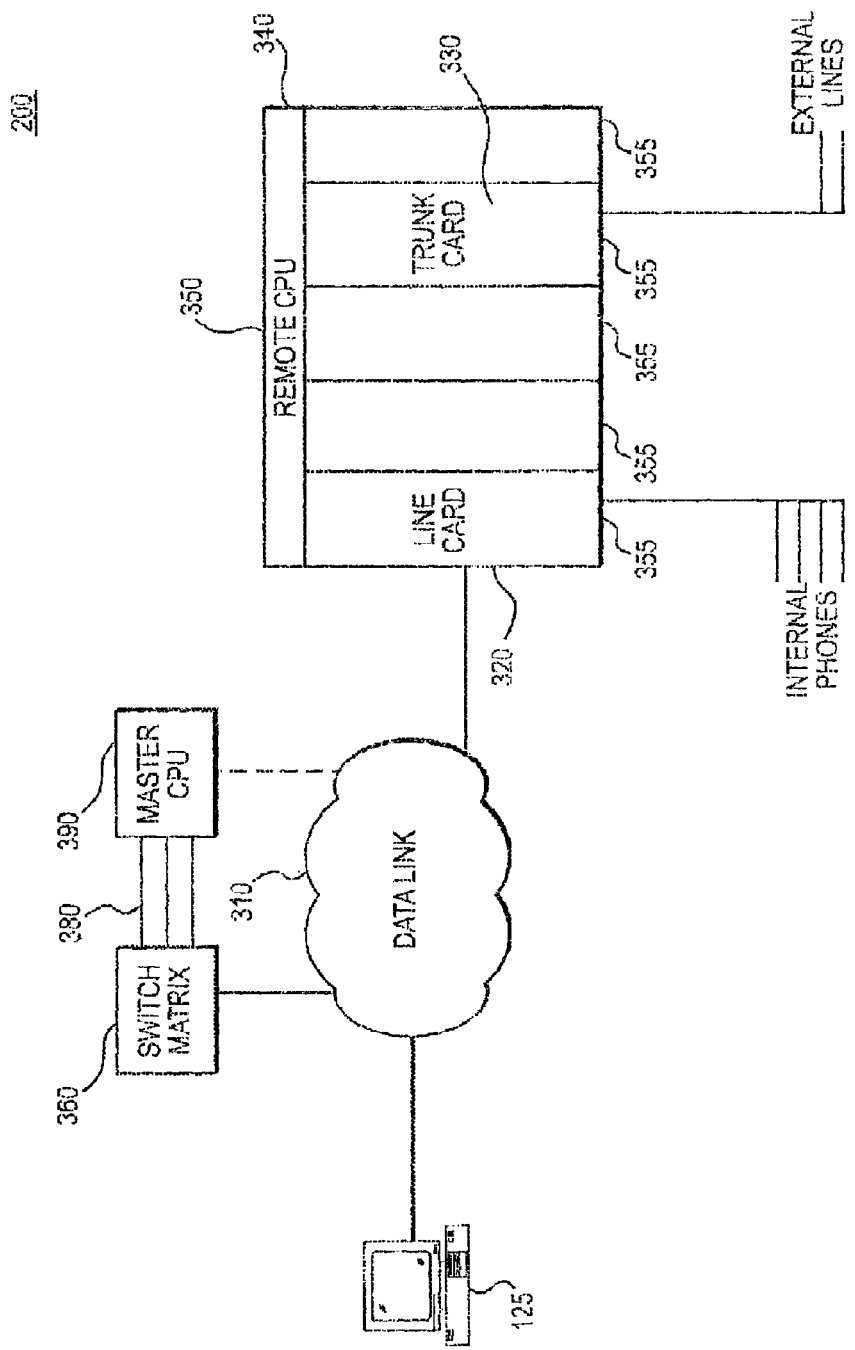
FIG. 3 illustrates a more detailed diagram of the system of FIG. 2.

FIG. 3 illustrates a typical voice and data network 200. FIG. 3 includes a data network, such as a local area network (LAN), based voice switch (PBX) for transmission of voice data over a data link 310 using Internet protocol (IP). Voice devices, such as internal phones and external lines, are connected to a respective line card 320 or trunk card 330 contained in a remote or expansion cabinet 340 including a remote CPU 350 or shelf controller, via a respective line or channel. The cards 320 and 330 are selectively loaded into one of a plurality of slots 355 in expansion cabinet 340. Although a single expansion cabinet 340 is shown in FIG. 3, the PBX could include several expansion cabinets 340. Data link 310 connects expansion cabinet 340 to a switching matrix 360. Switching matrix 360 routes information from voice devices to other voice devices, internally through line cards 320 and externally through trunk cards 330. A process running on a master CPU 390 configures the present state of the switching matrix 360 over its backplane 380. Alternatively, master CPU 390 could be located apart from switching matrix 360 and the process running on master CPU 390 can configure switching matrix 360 over data link 310. Although each of the cards are shown as being loaded into an expansion cabinet 340, which is remote from the switching matrix 360, another implementation could include some cards in the same location, or physical cabinet, as master CPU 390. A computer 125 can also be connected to data link 310.

Figure 4:
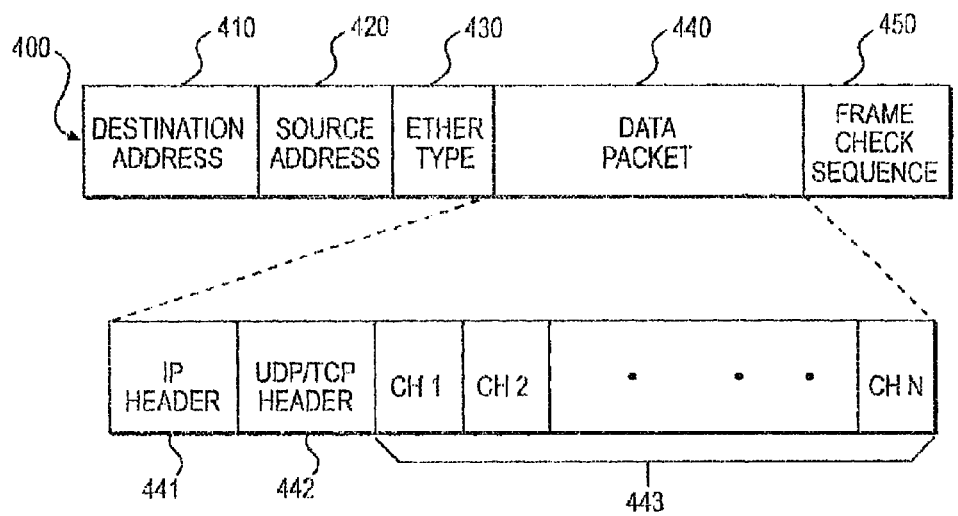
FIG. 4 illustrates the contents of a message sent in the network of FIG. 2.

Master CPU 390 and remote CPU 350 cause packets of a defined size to be created for transmission over data link 310. These packets include information used to route the packet to a destination and the voice or data information. FIG. 4 illustrates a format of a typical packet 400 using an Ethernet data link 310. Packet 400 can include, for example, six bytes of a destination address 410, six bytes of a source address 420, 2 bytes of an indication of an ether type 430, a number of bytes of a data packet 440, containing data from multiple voice devices, and 4 bytes of frame check sequence (FCS) data 450. Data packet 440 includes header information for the transmission protocol, such as 20 bytes of IP header information 441 and 4-20 bytes of UDP/TCP header information 442, and data 443 for N channels. Typically, the PBX sends 8000 packets per second that include voice data.

Again referring to FIG. 3, to initiate a call to a destination voice device, a source voice device signals a source card (e.g., line card 320 or trunk card 330) to send a message to switching matrix 360. Switching matrix 360 sets the switching fabric of the network to create a link between the source and destination voice devices. When a call is initiated by a device on remote cabinet 340 by the device going off hook, a message is sent by the source device on remote cabinet 340 to a call server process running on master CPU 390 indicating that it is off hook. The call server process configures switching matrix 360 to connect the source device on remote cabinet 340 to a channel that provides a dial tone to the newly active device. When dialing begins at the source device on the remote cabinet 340, indicating a desired destination to contact, another message identifying the dialed destination is sent to the call server process running on master, which, in turn begins evaluating the dialed number to determine if it is valid. If the call server process determines that the number is valid, it then begins searching for the requested destination device. When the destination device is found, the call server process instructs the switching matrix 360 to establish a connection between the source and destination devices via switching matrix 360, thereby establishing a two-way speech path.

Figure 5:
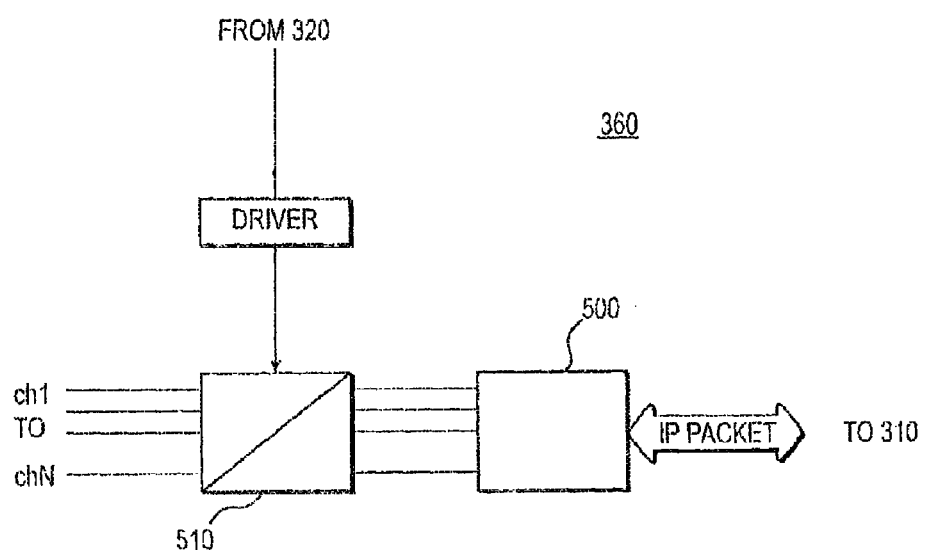
FIG. 5 illustrates a switching matrix of the network of FIG. 2.

FIG. 5 illustrates a typical switching matrix 360 for parsing and creating a packet. A multiplexer/demultiplexer 500 receives and sends IP packets over data link 310. When receiving IP packets, the multiplexer/demultiplexer 500 takes the sequentially ordered channels and puts them into parallel order and sends this information to the switch 510. Conversely, when transmitting IP packets, the multiplexer/demultiplexer 500 takes the parallel ordered channels from the switch 510 and places them in sequential order to be included in an IP packet. Multiplexer/demultiplexer 500 outputs parallel data to a switch 510 or creates an IP packet. A table in switch 510 determines the channel positions an IP packet. Of course, in non-blocking mode, each voice device in the network will have a channel available for assignment by the switching matrix.

Figure 6:
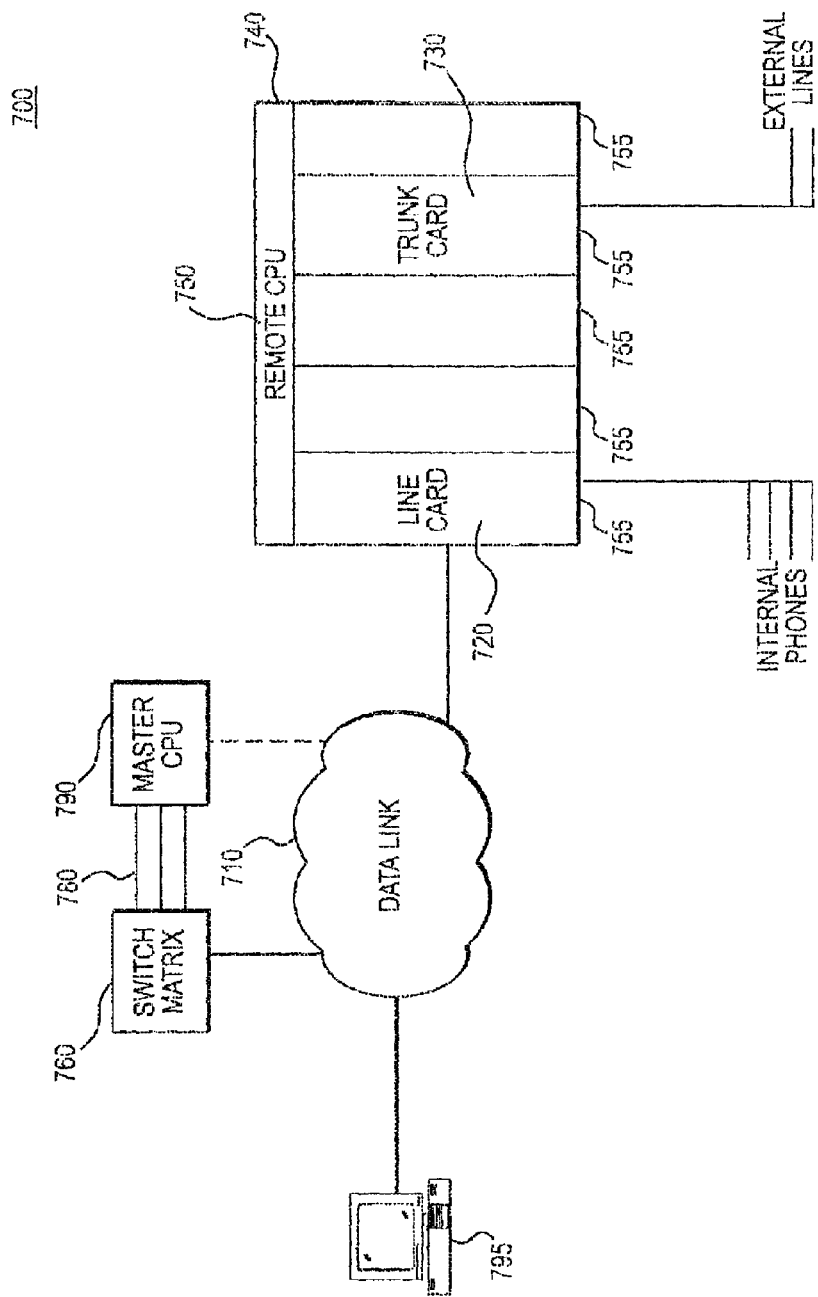
FIG. 6 illustrates a high level diagram of a system having a combined voice and data network consistent with the present invention.

FIG. 6 illustrates a high level diagram of a network 700 consistent with the present invention. Network 700 includes a system to transmit voice data, e.g., a LAN-based voice switch (PBX) over a data link 710 using Internet protocol (IP). Other data networks could also be used. Voice devices, such as internal phones and external lines, are connected to a respective line card 720 or trunk card 730 contained in an expansion cabinet 740, including a remote CPU 750, via a respective line or channel. The cards 720 and 730 are selectively loaded into one of a plurality of slots 755 in the device. Although a single expansion cabinet 740 is shown in FIG. 6, the PBX could include several expansion cabinets.

Data link 710 connects expansion cabinet 740 to a switching matrix 760. Data link 710 could be a single line or a multi-hop network. Switching matrix 760 routes information from voice devices to other voice devices, internally through line cards 720 and externally through trunk cards 730.

A process running on master CPU 790 configures the present state of the switching matrix 760 over its backplane 780. Alternatively, master CPU 790 could be located apart from switching matrix 760 and the process running on master CPU 790 can configure switching matrix 760 over data link 710. Although each of the cards are shown as being loaded into an expansion cabinet 740, which is remote from the switching matrix 760, another implementation could include some cards in the same cabinet as master CPU 790. One or more computers 795 can also be connected to data link 710.

Figure 7:
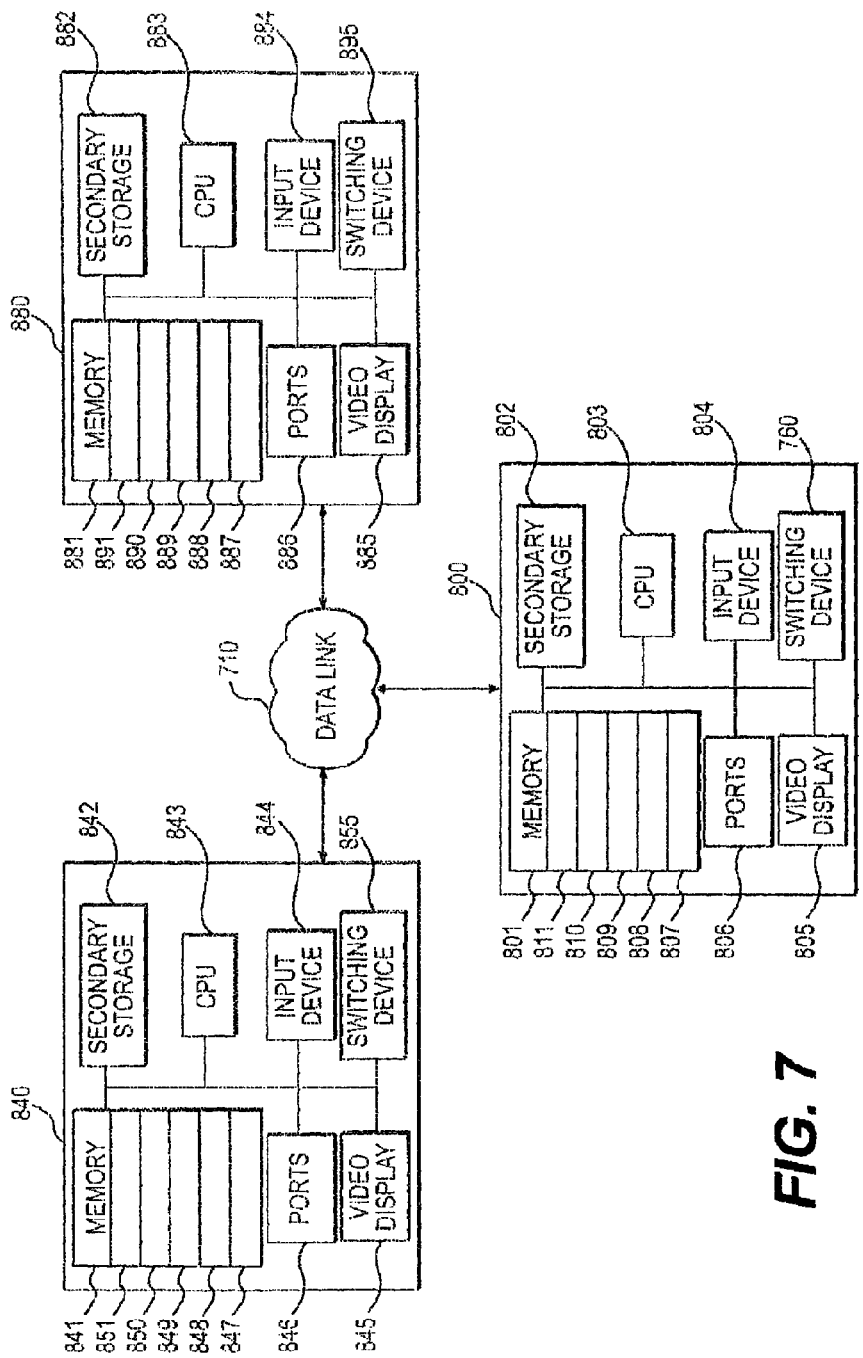
FIG. 7 illustrates a more detailed diagram of the system of FIG. 6.

Remote CPU 750, switching matrix 760, and master CPU 790 could be a number of machines, a separate machine, or a portion of a machine. For example, as shown in FIG. 7, each of remote CPU 750, switching matrix 760, and master CPU 790 could reside in cabinets that communicate via data link 710. For example, each of cabinets 800, 840, and 880 includes a memory 801, 841, and 881; secondary storage 802, 842, and 882; a central processing unit (CPU) 803, 843, and 883; an input device 804, 844, and 884; a video display 805, 845, and 885; and slots 806, 846, and 886. One skilled in the art will appreciate that cabinets 800, 840, and 880 may contain additional or different components and that each cabinet could include the same hardware as the other cabinets or different hardware. Each of memories 801, 841, and 881 includes an operating system 807, 847, and 887; a TCP/IP protocol stack 808, 848, and 888; an active communication detection program 809, 849, and 889; a table management program 810, 850, and 890; and a communication program 811, 851, and 891.

A set of cards is loaded onto slots 806, 846 and 886. Typically, cabinets 800, 840, and 880 would include at least ten slots. Each of the cabinets also includes a switching matrix. In a master/slave configuration, one of the cabinets (the "master cabinet"), for example cabinet 800, would include the master CPU 790 and the switching matrix 760. Other cabinets 840 and 880 include remote CPUs 843 and 883 and switching matrixes 855 and 895, and be referred to as the remote or expansion cabinets. In a centralized master/slave configuration, only the switching matrix of the master cabinet establishes and terminates two-way speech path connections and is thus referred to as the master switching matrix. In other configurations, the switching matrices of the remote cabinets could also establish and terminate two-way speech path connections with, for example, other voice devices connected to the same remote cabinet. In this case, the master cabinet could supervise the remote cabinets.

Figure 8:
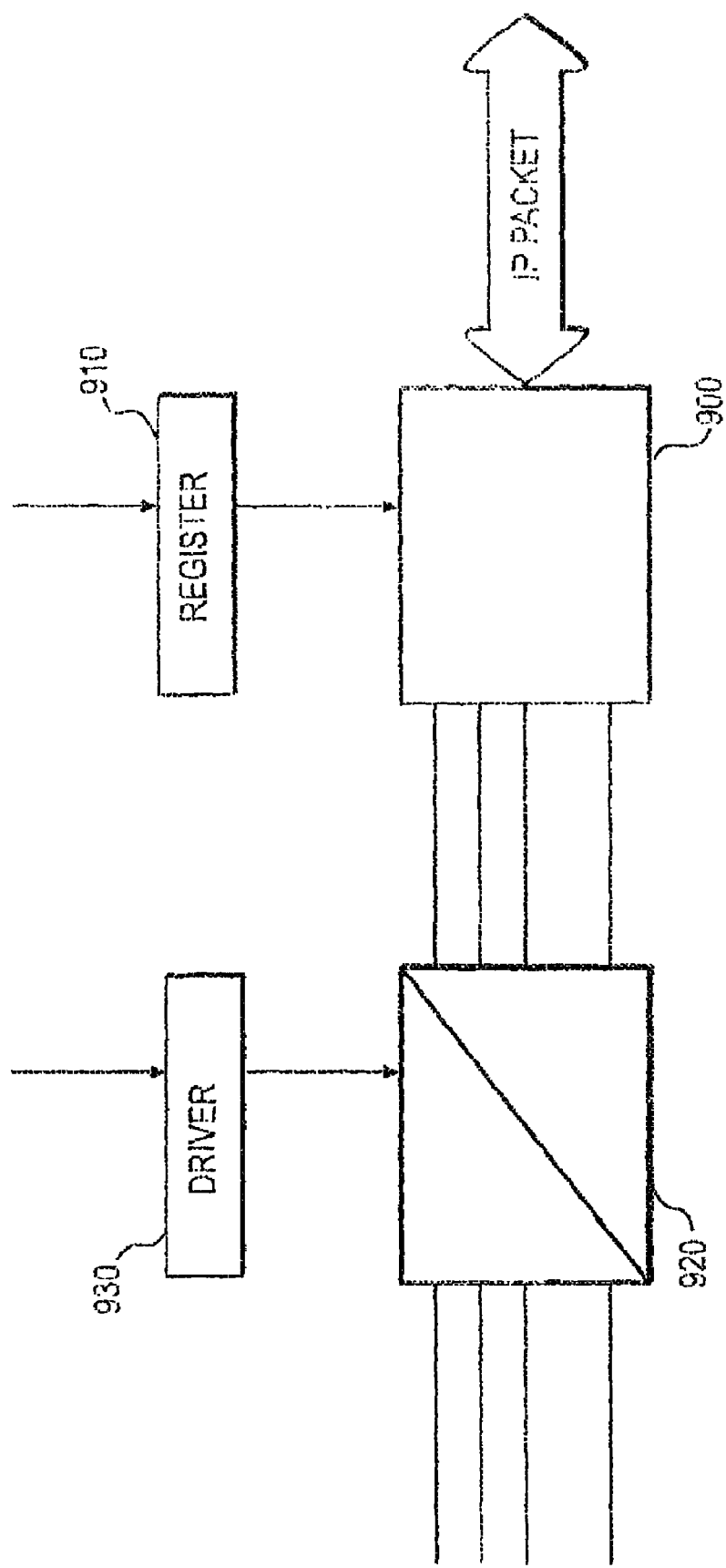
FIG. 8 illustrates a switching matrix of the network of FIG. 6.
Figure 9:
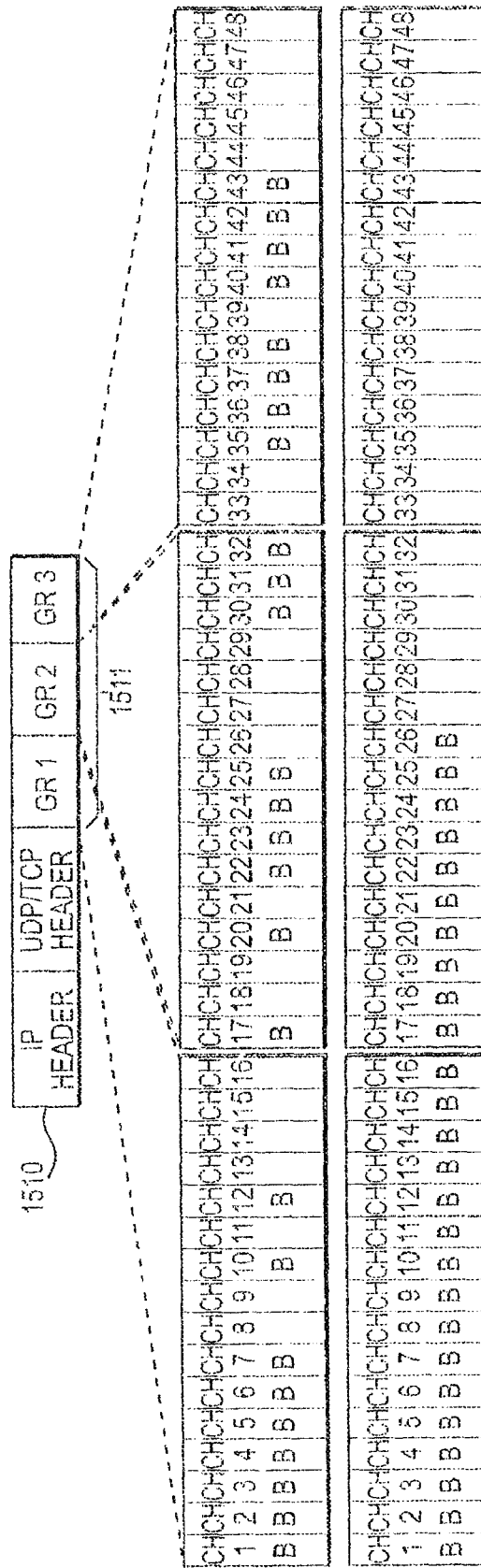
FIG. 9 illustrates the contents of a message sent over the network based on active channel reordering to deallocate channel groups.

As shown in FIG. 8, each of switching matrixes 760, 855, and 895 include a multiplexer/demultiplexer 900 and a register 910. Although register 910 is shown as separate from multiplexer/demultiplexer 900, multiplexer/demultiplexer 900 and register 910 could be combined in a single device. Multiplexer/demultiplexer 900 formats and receives packets sent over data link 710 and outputs parallel data to a switch 920 or an IP packet to data link 710, using, for example, a field programmable gate array. Register 910 stores a value that indicates the maximum channel number in the packet.

PBX applications are capable of transmitting a number of voice channels on a periodic basis. For example, 320 voice channels may be transmitted every 125 microseconds per link, giving rise to a bandwidth of 30 Mbps (voice+signaling, one byte per channel). Since voice packets occupy the largest share of this bandwidth, a system consistent with the invention derives certain measurements as an indicator of network behavior and dynamically adapts the system to insure that a certain level of Quality of Service is maintained at all times.

Recent developments introduced by Nortel Networks, have resulted in the capability of PBXs being extended, by providing distributed PBX communication capability over data networks.

The Option 11C system manufactured by Nortel Networks is a version of the Meridian-1 System constituting an integrated Private Branch Exchanges telephone system which has the capability of handling integrated voice and data communications on a single-site system or directly networked with a number of other Option 11 C systems. Option 11 C/Meridian-1 systems are mentioned as examples of systems wherein the principles of the invention may be advantageously used.

However, it will be apparent from the description herein that the invention may also be used advantageously in a variety of other types of systems and networks.

When a packet is received, switch 920 places the parallel data from the demultiplexer 900 onto the appropriate channel in the cabinet based on setup information from driver 930. When a packet is to be sent, switch 920 places the data for each active channel detected onto an input of the multiplexer 900 based on setup information from driver 930 so that a packet can be formed.

B. Architecture

Figure 10:
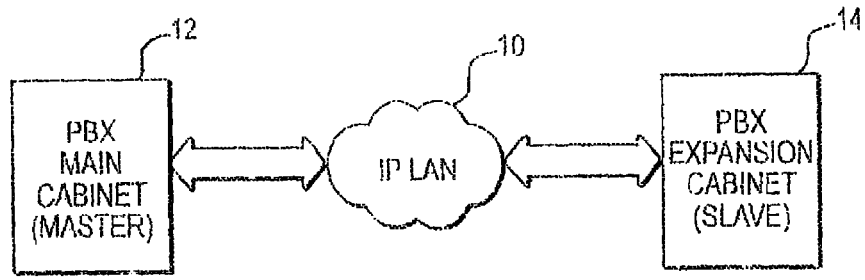
FIG. 10 illustrates a PBX telephone system comprised of PBX main and expansion cabinets connected via a data network.

Referring now to FIG. 10, an objective of the aforementioned development is to provide the capability to support communication (including voice) between two or more PBXs over a data network, such as an IP LAN 10. In one configuration, one PBX 12 acts as a master (also referred to as the main cabinet) containing a master CPU and master switching matrix and the other PBXs 14 are slaved (also referred to as the expansion cabinets).

Communication between the PBX cabinets comprises groups of voice and other packets. The voice packets are transmitted periodically, and are fully controlled by software, hardware, or both (i.e. formation and transmission) and may, for example, be UDP packets. The other packet group includes signaling, Common Equipment Multiplexed (CEMux), heartbeat and cardlan messages. They may comprise TCP packets which are software controlled.

Each PBX cabinet will typically include a switching device, a hardware device that provides a pulse code modulation (PCM), voice and data for the entire PBX system. In one implementation of such device will have an identical number of channels on each side. One side will perform local switching for that particular cabinet (voice devices connected to that cabinet). The other side will be dedicated to perform switching for voice devices located outside the cabinet (not connected directly to the cabinet).

The PBX may also be equipped with hardware circuitry which includes several Field-Programmable Gallium-Arsenide integrated circuits (FPGA) which provide the certain functionality for IP links. Typically, this includes formatting of the PCM samples from the switching matrix UDP packets and vice-versa; monitoring link performance; and controlling the packet delay buffer. The board may also include several FIFO RAMs for buffering of incoming messages and two dual port RAMs for Packet Delay Variation buffering of incoming PCM data.

A voice packet includes a sequence of PCM samples that have been captured from the IVD bus and packaged into a UDP/IP packet. Typically, voice packets are limited to having one Medium Access Control (MAC) UDP/IP destination for all samples. The FPGA stores one header that prefixes all outgoing voice packets. The voice header information is written into the PCM Header RAM prior to enabling voice transmission. Transmission of the voice packet is enabled by setting the Voice Device Enable bit in a command register. Packets are sent every 125 microseconds and contain up to 320 PCM samples.

Figure 11:
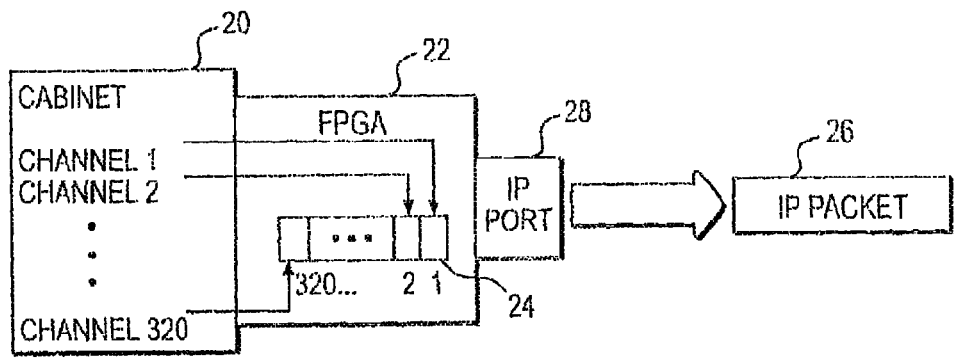
FIG. 11 illustrates the transmission of voice packets in a main or expansion cabinet.

FIG. 11 illustrates the connections for transmission of voice packets. PBX cabinet 20, which can be either a main or expansion cabinet, is typically able to accommodate up to 320 voice channels. (The maximum number of channels can be configured by the user or the software to include a lesser or greater number of channels.) Daughter board 22 incorporating a FPGA IC is connected to cabinet 20. Each transmitted packet 24 typically contains a maximum of 320 PCM samples. The transmitted packet 26 is forwarded to the network via IP port 28.

Figure 12:
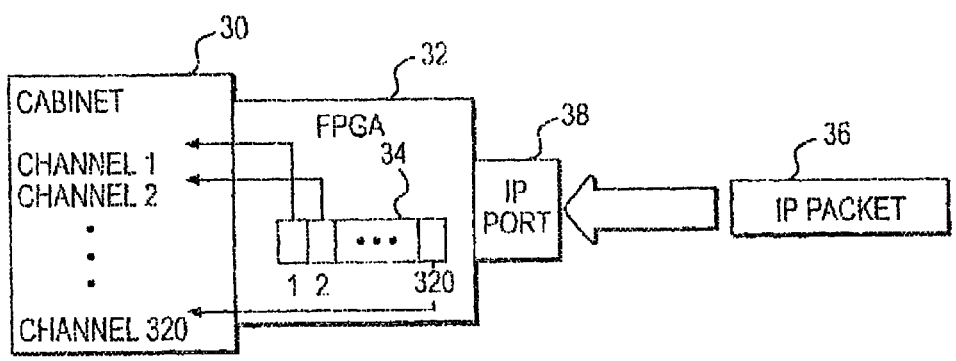
FIG. 12 illustrates the reception of voice packets in a main or expansion cabinet.

Similarly, PBX cabinet 30, shown in FIG. 12, which can be either a main or expansion cabinet incorporates an IP port 38 which receives incoming packet 36. Typically, a FPGA incorporated within board 32 is capable of receiving packets containing, for example, up to 320 PCM samples/channels. The received packet 34 populated with the samples is processed by the FPGA IC so that each byte of the voice frame is re-mapped to unique channels, one for each of the bytes, shown as channels 1, 2 . . . 320 in cabinet 30.

C. Performance Measurements

According to a feature of the invention in data networks, Quality of Service is determined by evaluating at least three parameters: Latency, Packet Loss Rate, and Bandwidth availability. While only three factors are explicitly enumerated here, one of ordinary skill will appreciate that any other parameter relevant to network performance may figure into the determination.

Latency is a measurement of the time that it takes a given packet to pass between two points in the network. Factors that may affect latency in a network include, for example, the type and number of switches, type and number of routers, retransmission, distance traveled, network congestion, and link bandwidth. Packet Loss Rate is related to the number of packets that become dropped from the network as a consequence of lack of network resources. One of the factors that may affect the Packet Loss Rate is the packet dropping mechanism used by the router, such as Random Early Drop. It is expressed as a ratio or percentage, as will be more fully described hereinafter. Bandwidth Availability is governed by both Latency and Packet Loss Rate.

In order to understand the measurement methodology for QoS system requirements, the parameters to be measured and the interpretation of these measurements will next be described.

Considering, as an example, a system that would provide voice quality in an IP LAN, the following requirements would have to be met:

Network Requirements:
Packet Loss Rate of less than 1%.
One way trip time for a packet of 3.75 millisecond.
100 Base-T Full duplex LAN connectivity.
System Requirements:
Voice Packets:
Rate: 8000 packets/second; and
Packet Width: 320 bytes (one channel per byte, using the G.711 standard).
Call Set-up and Call Terminating Signalling Packets:
Rate: 250/sec; and
Width: 40 bytes.
Common Equipment-MUX (CE-MUX) Packets:
Frequency: 10/second; and
Width: 500 bytes.

Given the above system parameters, the required bandwidth, in Mbps, would be 29.25 Mbps, per port.

This amount represents the bandwidth required for one way traffic. Multiple ports can be assigned on the main cabinet, each communicating with a single expansion cabinet, thereby increasing the available capacity.

Several ways may be employed to obtain QoS parameters from the IP network application layer. A dedicated client server model (TCP or UDP) can be set up to generate traffic. The client sends a packet and waits for the reply. The server will redirect the same packet upon reception, or send different packets. Implementation is via either synchronous or asynchronous communication modes. In the synchronous mode, the client transmits packets which may contain the system timestamp as well as a counter in its packet payload. In this case, transmission and reception are independent of each other. With asynchronous implementation, the client awaits the reply prior to transmitting the next packet. In this case, a timestamp may or may not be included within the payload.

Another way to monitor LAN QoS is to use the Internet Control Message Protocol (ICMP). In this case only the client is needed to control message formation and time of transmission. (Usually, the network server process will be supplied as part of the operating system or by a third-party, to provide an echo for the client.) Both of these techniques have some real-time impact in addition to the traffic overhead added-on in order to perform the measurements.

According to a feature of the invention hardware systems are employed to perform measurements using certain parameters associated with voice packets, resulting in more accurate measurements, while avoiding the above-noted shortcomings.

Figure 13A:
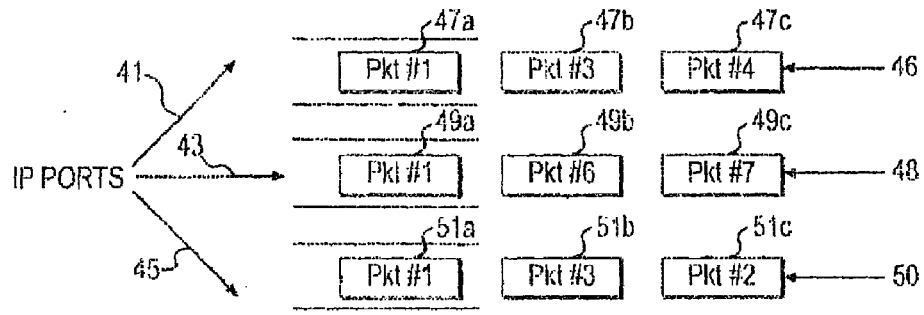
FIG. 13a illustrates operation of a packet loss counter.

Packet Loss Counter (PLC). One way of implementing a Packet Loss Counter may be via a hardware register, as shown in FIG. 13a. Each voice packet is labelled (within its payload) with a sequence number. The receiving end monitors the sequence of packets and as each packet is received when a break in sequence of the arriving packets occurs, the counter is incremented by one digit. A number of packets 47a-c, 49a-c, 51a-c forming data streams 46, 48, 50 are shown entering a plurality of IP ports 41, 43, 45, respectively. When a packet arrives out of sequence, e.g., a sequence such as {1, 3,} (corresponding to packets 47a, 47b, 47c), the counter is incremented by 1. A sequence such as {1, 6, 7} (corresponding to packets 49a, 49b, 49c) results in incrementing the counter by 1, since packet numbers 2, 3, 4 and 5 are missing from the data stream. A sequence such as {1, 3, 2} (corresponding to packets 51a, 51b, 51c) will result in the counter being incremented by 2, since packet #2 arrives out of sequence (after packet #3). Thus, the value on the counter is an indicator of the degree of packet loss.

Figure 13B:
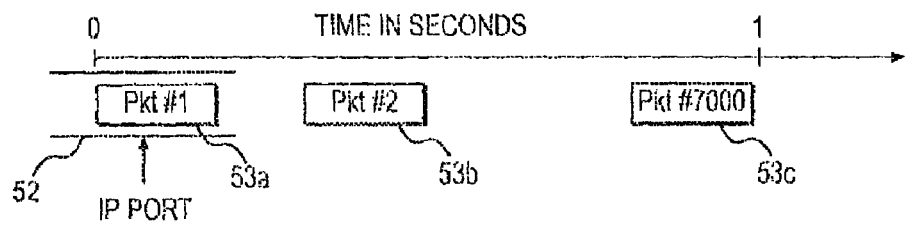
FIG. 13b further illustrates operation of a packet loss counter.

FIG. 13b depicts an alternative hardware implementation of a Packet Loss Counter implementation showing data stream 52, including representative packets 53a, 53b and 53c (numbered #1, #2 . . . #7000). Using the total number of packets expected to arrive per second (e.g., 8000) as a reference, when each packet arrives (a counter will be incremented until the end of time period (second) here shown as 7000), the balance of 1000 comprising the packets that did not arrive at the port within the given time frame represents the number of packets lost. This measurement may be done at short intervals (e.g., every second). The counter is then reset to the reference number (e.g. 8000). In FIG. 13b which shows the packets traveling as a function of time, the packet loss counter will therefor read 1000 after the first second.

When the system detects the packet loss counter being incremented repeatedly over a number of time intervals (as in the first mentioned implementation) or more than zero (as in the second mentioned implementation), the inference is that the network is congested. As a result, one or more bandwidth optimization techniques are implemented, according to certain inventive features to reduce the size of the voice packet. An alternative implementation is to use software to perform packet loss measurement TCP/UDP/ICMP-generated traffic.

Figure 14:
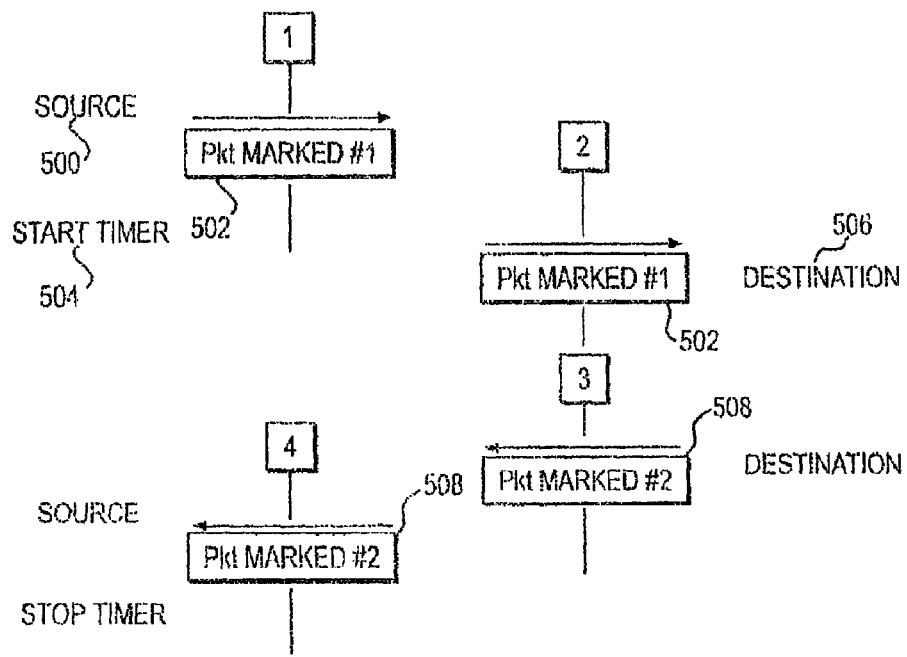
FIG. 14 is a diagram showing operation of packet round trip time calculation.

Latency. Latency is also an indicator that the network has become congested. One way of recording the round trip time required for voice packets to transit a network is to use a hardware register. Referring to FIG. 14, source 500 marks packet 502 as #1 (Step 1) prior to sending it and also starts timer 504. When the destination machine 506 receives packet 502 (Step 2), it complements the value that will be transmitted on the next packet as packet #2 (508) back to the source (Step 3). Upon the arrival of the #2-marked packet (Step 4), the timer stops and the time difference is stored in the trip register. Such marking is done within the payload of the respective voice packets.

An alternative implementation is to use software to perform the round trip time measurement using TCP/UDP/ICMP-generated traffic.

Packet/Cell Delay Variation Overflow and Underflow. Underflows and/or overflows of the memory buffer (PDV Buffer) result in a change in one or both memory buffer pointers (read/write pointers). Half the buffer memory size is changed spacing between the pointers. Logging this count is done by hardware register record the number of underflow and overflow events. These counters can be used to determine the stte of the network. Underflow occurs when packets arrive slower than the ability of the system to process them. On the other hand, when voice packets arrive from the network faster than the system processes them, overflow occurs resulting in overwriting the previously received packets and consequently resulting in loss of data.

Bandwidth. A software module provides measurement of bandwidth. One way of performing this measurement is to sum the total length of arrived packets per second minus the number of packets lost (obtained from the packet loss counter). All the transmitted and received packets are periodic. Another alternative is to use TCP/UDP/ICMP to record the round trip time to generate packets of different sizes and to record their round trip time.

Using the parameters measured according to the above, software consistent with the invention is able to adapt the system to the behavior of the network depending on the measured values. In addition, the user may be provided notice about network behavior and voice quality after such adaptation via a terminal display, a printer or a voice message.

System Reaction

Based on the measurements described above obtained from the packet loss counter, packet delay variation overflow and underflow and bandwidth measurements. The system will react by taking one or two actions, namely starting of bandwidth optimization and/or changing PDV Buffer size.

Bandwidth Optimization

A number of mechanisms can be employed consistent with the present invention to optimize the transmission bandwidth. These include: Static Bandwidth Optimization, Adaptive Bandwidth Optimization and Combined Mode. With the exception of the Static Bandwidth Optimization method, bandwidth optimization is performed by reconfiguring the switching matrix residing on the main cabinet and on the expansion cabinet. In addition, a table containing the updates of the recent configuration of the switching matrix will be maintained on both cabinets. Issuing the commands to reconfigure the switching matrix can be reserved to the main cabinet and synchronization of the table will follow. The new maximum number of channels is required to be set or both the main and expansion cabinets based on the new switching matrix configuration which may result in a lesser number of channels to be transmitted by both the main and expansion cabinets. This can be achieved by getting a new value through the FPGA.

1. Static Bandwidth Optimization: This feature involves the user configuring a value which limits the maximum number of channels transmitted (by, e.g., blocking or disabling several voice channels exceeding such limit), when the software detects problems such as packet loss. As previously described, the maximum number of channels to be transmitted is typically on the order of 320. If the packet loss counter is incremented in several consecutive time windows, the software will instruct the FPGA to decrement this value, thus reducing the number of voice channels and appropriately notify the user that bandwidth has been reduced.

2. Adaptive Bandwidth Optimization: This feature may be implemented via several techniques: Empty Slot Elimination, Idle Channel Elimination, Idle Card Elimination and Priority Based Card Elimination:

a. Empty Slot Elimination: Typically, each slot is represented by 32 bytes (32 channels on the IP packet, where the slot number is mapped to the location of these channels in which the first slot channels will be followed by the second slot channels). The QoS software can recognize the inserted cards in the expansion cabinet. A lookup table eliminates empty slots and includes only channels which correspond to physically inserted cards in the voice packet by realigning channels, either by moving them from the end of the packet to an empty slot location, or by shifting the channels by the value of the empty slots. As an example, if card 1 is present, card 2 is absent, and card 3 is present, channels associated with card 4 may be mapped into the slot #2 location in the IP packet, via software implementation.

b. Idle Channel Elimination: The software monitors active (busy) channels in which communications between the main cabinet and a voice device on the remote cabinets is established based on the information provided by signalling (since the main cabinet performs all switching). The software re-maps the active channels from the end of the voice packet to the first available idle one (e.g., channel number 320 can be remapped as number 30).

c. Idle Card Elimination: As the software monitors the number of active channels on a given card, if all channels are idle for that card, this will be treated as if it were an empty slot (i.e., the card will be eliminated, as in the case of empty slot elimination). Once there is a request for a call setup from (or for) an eliminated card, that card (all or a portion) becomes active and all the channels for that card will be allocated on the packet.

Figure 15A:
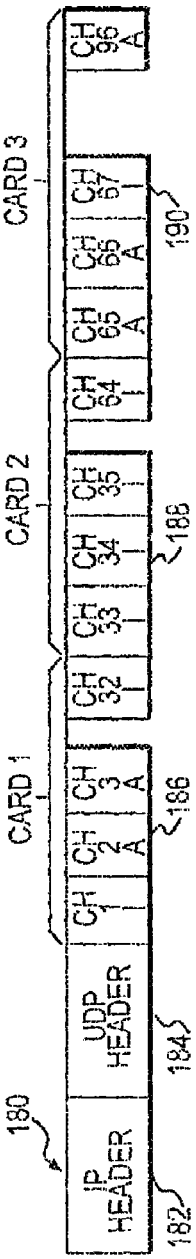
FIGS. 15a-15b illustrate operation of bandwidth optimization using idle card elimination.

Referring now to FIG. 15*a*, there is shown a technique for Idle Card Elimination according to a feature of the invention.

Figure 15B:
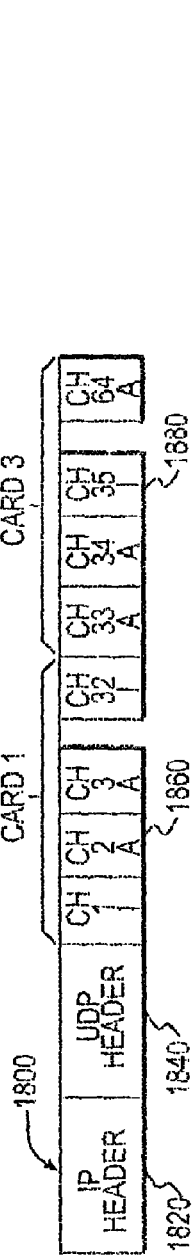

A packet 180, here shown as comprising three cards, 186, 188, 190, also includes IP header 182 and a UDP header 184. Each card has 32 channels assigned to it. Certain channels are active (designated in the Figure as "A") and others are inactive or idle (designated as "I"). In the example shown, all of the channels in the second card 188 are idle. With the Idle Card Elimination feature as shown in FIG. 15*b*, the channels associated with the second card are eliminated, the channels associated with the third card, 190, are mapped as channels associated with card #2 and the system recognizes that packet 1800, containing header information 1820, 1840 now contains two cards, 1860 and 1880, each having at least some channels active. The bandwidth is thus optimized by reducing the number of channels associated with cards in the transmitted packet. This can be achieved by searching the switching matrix status table described earlier for a group of channels collocated with each other with a starting index matching the index of the first channel on a given card.

For example, if a cabinet contains cards 1, 2 and 3, each card being associated with 32 channels on the IP packet, the search would start at channel 1 and look at the next 32 channels to check whether all 32 channels are idle. If not, the same process will be repeated, starting at channel 33. If there is a match, i.e., all 32 channels are idle, these channels will be eliminated from the IP packet.

If a signalling message from a voice device located on the expansion cabinet requests a connection or channel that is not allocated within the IP packet, the main cabinet will search for a card corresponding with that voice device requesting the connection. If the card is physically inserted, all of the corresponding channels will be reinserted within the IP packet. (All or a partial number of the channels may be reinserted again.)

The search is time dependent, i.e., the search can be configured to be performed periodically or within varying time window frames.

d. Priority Based Card Elimination:

The user assigns priority for each card present in a cabinet.

When a priority based card elimination process starts, the card will be eliminated from the IP packet, based on its assigned priority.

Figure 16A:
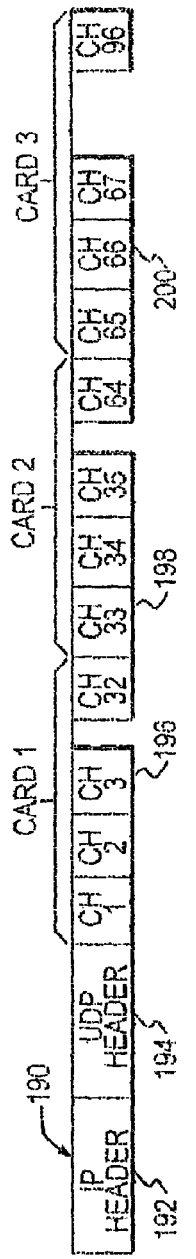
FIGS. 16a, 16b and 16c illustrate operation of bandwidth optimization using priority-based card elimination.

Referring now to FIG. 16*a*, there is shown a technique for card priority assignment according to a feature of the invention.

Figure 16B:
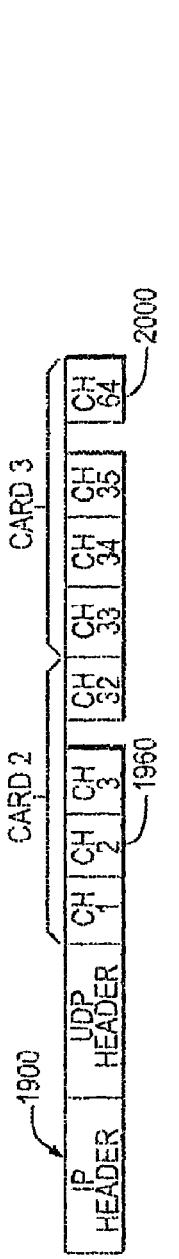

A packet 190, here shown as comprising three cards, 196, 198, 200, also includes an IP header 192 and a UDP header 194. Each card has 32 channels assigned to it. In this example, the system is configured to assign the highest priority to the second card 198, and the lowest priority to the first card, 196. When network conditions are such that bandwidth optimization needs to be enabled, the system drops the card having the lowest priority. In this particular example, channels associated with card 196 (having the lowest priority) are dropped and channels associated with cards 198 and 200 are shifted in position. As shown in FIG. 16*b* channels associated with card 198 are then remapped as the first card, 1960, and channels associated with the third card are remapped as if they were associated with the second card, 2000.

Figure 16C:

This process may be continued based on the next lower priority of the remaining cards. Thus, the channel associated with the third card 2000 in FIG. 16*b* was, for example, assigned the lowest priority and the channel associated with the second card 1960, the highest. FIG. 16*c* shows the resulting configuration after implementing priority based bandwidth optimization. The channels associated with a single card 1904 (corresponding to card 1960), 198, remains in the packet. Again, the number of channels associated with cards in the transmitted packet has been reduced.

This can be implemented by maintaining a table that contains the priority assignment for each inserted card. Once bandwidth reduction is required, a search for the lowest priority is conducted in the table and a corresponding channel associated with the identified card (i.e., the card with the lowest priority) will be eliminated from the IP packet. This elimination is done by reconfiguring the switching matrix and updating the table.

3. Combined Mode: A combination of both Static and Adaptive bandwidth optimization modes may also be enabled. In this mode, the user configures the maximum number of channels to transmit, along with Empty Slot Elimination, Idle Channel Elimination, Idle Elimination, Priority Based Card Elimination, or any combination thereof.

PDV Buffer Size

The Packet Delay Variation (PDV) buffer is used to buffer the packets for a certain amount of time, pending their ability to be processed. The PDV buffer length in milliseconds sets the amount of time the packets can "wait" in the buffer. If the PDV buffer size is too large, the resulting delay before the packet can be processed will also be large. On the other hand, if the buffer is small, there is a greater chance that the packet may be overwritten, resulting in a loss of data.

Overflows and/or underflows are indicators that network has become degraded, resulting in lowered voice quality. To reduce the effect of such degradation, the size of the buffer can be either increased or decreased, depending on the event. Software monitors the buffer through overflow and underflow counters and adjusts the buffer accordingly. In addition, software provides the user the capability to set the size of the buffer manually.

Startup Mode:

One strategy for system startup mode would be the utilization of QoS parameters to measure the bandwidth. The number of transmission channels is increased incrementally until full system capacity is obtained. Also, the PDV buffer size is set to a default valve. Based on information obtained from the Underflow/Overflow counters, the buffer size may be adjusted accordingly.

Based on another strategy, the System may start up by transmitting the maximum number of channels within the voice packet and based on measurements of QoS parameters, the number of channels may be reduced accordingly.

Software Design Methodology

Parameter Measurement Techniques

The measurements are calculated for presentation to the user upon his or her request to be stored for later analysis of system behavior.

Packet Loss Rate: Regardless of the type of hardware used for implementing the PLC, the following assumptions are made (by way of example only, and are not intended to be limiting in any way). First: on a low traffic network, the Packet Loss Counter (PLC) maps, one-to-one, the number of packets lost. Second: that the packets will not be arriving out of order (i.e. all packets will follow the same path from source to destination). Third: 8000 voice packets are transmitted per second. At a given time, the packet loss rate (PL) is:

$$PL_t = \frac{100 \times PLC_t}{8000 \times \Delta_t}$$

where $\Delta_t$ is the interval between the current and previous measurement, in seconds.

Provided the second PLC hardware implementation is used (i.e. measuring the number of packets received, as shown in FIG. 13b), the measurement will be performed every second. Consequently, $\Delta_t=1$. If the first PLC implementation is used, either a fixed or changing time window can be used to read the hardware register for obtaining the measurement.

An alternative way to obtain these measurements is via software implementation using TCP/UDP/ICMP-generated traffic. The packet loss, ρ, is computed from the ratio of the number of packets received, R, with respect to the number of packets transmitted, T, $$\rho = \frac{R}{T}$$

and the percentage is:

PL=$[(1-\rho) \times 100]/\Delta_t$, where $\Delta_t$ is the time window size for this measurement which can be either a fixed or varying window.

Accuracy of these measurements is dependent on the volume of the traffic generated over a period of time.

Latency: Assuming by way of example only that incoming and outgoing packets follow the same path, i.e. the network latency is the same in both directions, at a given time, t, the one way latency ($L_t$) introduced by the network is:

$$L_t = \frac{rtt_t}{2} - \text{(processing time)}$$

where $rtt_t$ is the round trip time for the packet transmission. For hardware implementation of round trip time measurement, the processing time is negligible, and thus assumed to be zero. An alternative way to obtain these measurements is a software implementation using TCP/UDP/ICMP-generated traffic. For software implementation, accuracy of these measurements is dependent on the volume of the traffic generated over time, as well as processing time.

Since voice packets are transmitted and received periodically, a more accurate measurement can be obtained by calculating the time difference between the arrival of two consecutive packets.

Packet Delay Variation: Since streaming of voice packets are timely-dependent, this parameter may be used to monitor voice quality.

If a hardware implementation is used, an indication of packet delay variation is any increment of overflow and/or underflow in the packet delay variation register. Polling of this register can be done via either a fixed or varying time window.

The Packet Delay Variation may be defined as the difference between the average (moving/changing/incrementing history window) arrival times and the arrival times of the latest packet. Consequently, an alternative way to obtain these measurements is a software implementation using TCP/UDP/ICMP-generated traffic. The minimum, maximum and average values of the packet arrival times are recorded for a specific period of time in a file, memory or a buffer.

Bandwidth: Assuming that outgoing packets will always follow the same path, at a given time, t, the bandwidth, $BW_t$ is:

$BW_t$=[(sum of size of packets transmitted)−size of packet loss)]/$\Delta_t$ where $\Delta_t$ is the duration of the measurement interval in seconds.

An alternative way to obtain bandwidth measurements is to use TCP/UDP/ICMP-generated traffic.

For simplicity, and to minimize the add-on traffic as well as to reduce the computational overhead on the CPU, two TCP/UDP/ICMP packets of different sizes are sent periodically. These messages are labelled as small and large packets (depending on their respective sizes). After the reception of both echo replies, the difference $\Delta_\tau$ between the round trip times, rtt, of the large and small packets is computed, as follows:

$\Delta_\tau = rtt_l - rtt_s$ where $rtt_l$ and $rtt_s$ are the round trip times for the large and small packets, respectively. Another parameter used to compute BW is the difference in packet lengths:

$\Delta_l = L_l - L_s$ where $L_l$ is the length of the large packet and $L_s$ is the length of the small packet, in bits. Finally, the throughput is $$BW = \frac{\Delta_l}{\Delta_\tau}$$

Bandwidth Restoration

The software will monitor the availability of bandwidths measured as described in the previous section and the PLC for a period of time. Once a repetitive reading from the PLC indicates that no additional packets have been lost, bandwidth optimization mechanisms may then be reversed gradually. Bandwidth is then monitored continually to determine if any degradation has occurred. The increment is done gradually up to the maximum number of channels available on the system. The time window used to monitor the PLC and bandwidth measurements can be of a fixed or changing size.

PDV Buffer Size Restoration

As software will monitor the PDV Underflow/Overflow counters for a period of time, when it detects that there is no change in either counter, software will reduce the size of the buffer gradually and continue monitoring under either of these counters increments.

User Interface

The QoS monitoring functionality is interpreted as rating the Quality of Service of the data network based on predefined thresholds. Ratings and average values are displayed on the user terminal and also are stored, for example, in a fixed-size log file. In addition, the software permits changing and configuring several parameters, such as PDV buffer size, maximum number of channel and thresholds.

Control of QoS monitoring can be maintained on either the main or the expansion cabinet. If any QoS parameter goes below a predefined threshold level, appropriate warning messages are generated and communicated to the user on a display, printer or via a messaging system, such as a pager. The thresholds used are either default values or user-defined new values.

The parameters displayed include:
  RTD (Round Trip Delay).
  Packet errors (Loss).
  PDV buffer underflows.
  PDV Buffer underflows.

Examples of rating thresholds and the accompanying respective message displays are as follows:

Round Trip Time Delay (RTD)

| Threshold | Message Displayed |
|---|---|
| <10 ms | Excellent |
| <15 ms | Good |
| <20 ms | Fair |
| >20 ms | Poor |

Packet Loss (% of errors)

| Threshold | Displayed Message |
|---|---|
| <1% | Excellent |
| <2% | Good |
| <3% | Fair |
| >3% | Poor |

Obviously, these thresholds are exemplary only and may be adjusted to suit user requirements. Since multiple ports are available on the main cabinet, the user may specify the port or ports to be monitored. Configuration of each port may be done collectively or independently.

Detailed Architecture

The QoS monitoring software component may be implemented in several ways. One approach involves dedicating a single task (process) on the main cabinet to poll the hardware registers, and perform the actions. In this case, the task is responsible for monitoring all IP ports available on the cabinet. A second approach is to create a separate task per port. In either case, the task performs similar functionality. Collecting the QoS parameters from the expansion cabinet is done in the same way with the exception that these parameters are sent to the main cabinet to perform actions and display this information to the user.

The QoS monitoring task is created on the main and the expansion cabinets at start up, and are running all the time. Upon initiating the task on the main cabinet, a message queue is created to accept commands from the user to display the current measurement statistics of the system's behavior. Both tasks then start polling hardware registers using a default fixed or changing time window. The percentage of packet loss is computed, and compared with a predetermined threshold.

To ensure the accuracy of the measurements, the status of the link between the two cabinets is checked regularly based on the smallest measurement window obtained from a database file stored on the system computer.

To maintain consistency, the size of the PDV buffer, measurement time windows, and thresholds for each port is maintained in the database file. This file contains one entry for each Main Cabinet port and one entry for each Expansion Cabinet port.

All bandwidth optimization mechanisms can start on either end of the network as long as all related information is transmitted to the other end. The user has the flexibility to choose which technique to use.

The empty slot elimination bandwidth mechanism is based on card detection. The slot number of the inserted cards in the expansion cabinet is obtained. An array of size 10 is created. Its index represents the logical slot number and its value represents the physically inserted slot number (e.g., if cards 1 and 3 are inserted, the array is Slot[1]=1, Slot[2]=3, Slot[3]=null). On the main cabinet side generally only the XIVD values are calculated from the array.

The empty channel elimination bandwidth mechanism is based on monitoring the activity of all channels. This is achieved by creating an array of 320 representing the expansion physical channels and marking the active ones based on the information provided from signalling. A channel can only be marked once. When blocking is introduced, and a new connection request is made for a channel that exceeds the blocking range, the array is searched for a non-active channel and the corresponding array element is marked with the new channel number. For example, if the maximum number of channels is set by the user to be 180, and if channel 200 is requesting connection and element indexed 100 is not marked, channel 200 will be assigned logical channel 100. On the expansion side, the NIVD unit will be the logical value of the newly-assigned channel and the XIVD is the actual unit from the card. In the main cabinet the XIVD unit will be obtained from the array.

Changing the packet size for any of the optimization techniques implemented involves setting the local FPGA register with the maximum number of channels to transmit and notifying the other side of the new bandwidth so that it can set its FPGA register. This is done either by directly setting the FPGA of the expansion cabinet using the Remote Call Procedure (RPC) protocol or sending a new TCP or UDP message and implementing a server on the expansion cabinet to wait for these types of messages and setting the FPGA with the new values or include this message with other existing messaging systems (e.g., heartbeat, signalling, cardlan).

Similarly, setting the PDV buffer size, using either RPC or sending the new value to the other side in a message can be used. The difference in this case is that setting is done independently, i.e., changing the buffer size on the main cabinet may not require changing the size of the expansion cabinet. Software implementations comprising features of the present invention may be divided into three processes: Packet Loss Counter, Packet Delay Variation and Bandwidth Optimization.

Figure 17:
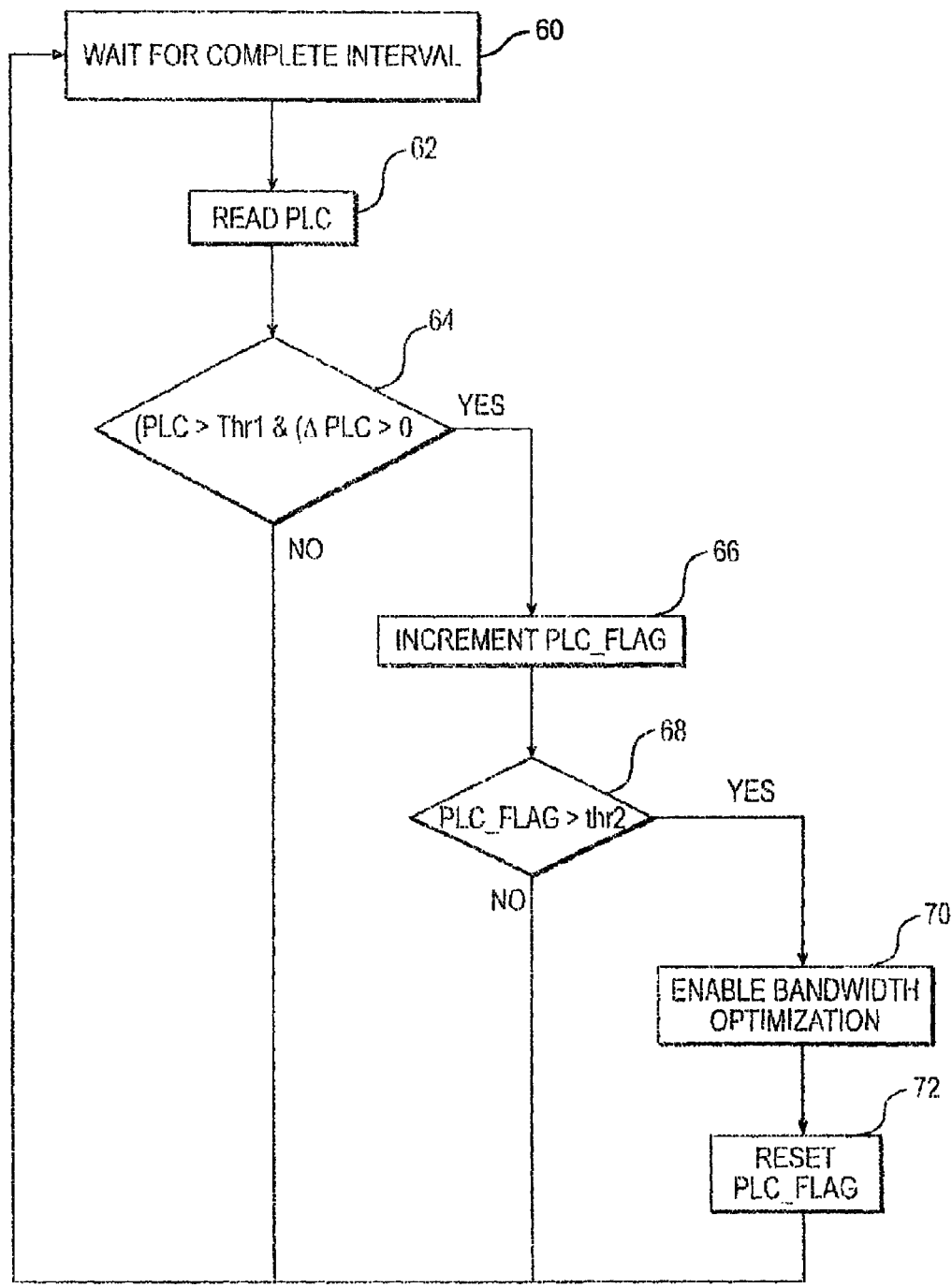
FIG. 17 is a flow chart detailing operation of a packet loss counter and system reaction.

Referring to FIG. 17, there is shown a flow chart depicting a process for measuring the amount of packet loss as an adjunct to enabling bandwidth optimization. A complete packet interval needed to fill the Packet Loss Counter hardware register described earlier is awaited (step 60). Next, the Packet Loss Counter (PLC) is read (step 62). If the PLC reading exceeds a predetermined threshold (expressed as PLC>Thr1) and, if the current PLC reading compared to the previous PLC reading is greater than zero (Δ PLC>0) (step 64), the PLC flag is incremented by 1 (step 66). Otherwise, the process of waiting for a complete packet interval is repeated (step 60). After the PLC flag is incremented (step 66), the PLC flag reading is compared to a second predetermined threshold (PLC_Flag>thr2, step 68). If the value of the flag exceeds that of the threshold, the network is inferred congested and the program proceeds to enable bandwidth optimization (step 70). Enablement also causes the PLC flag to be reset to zero (step 72) at which point the system and awaits a new complete packet interval (step 60).

Figure 18:
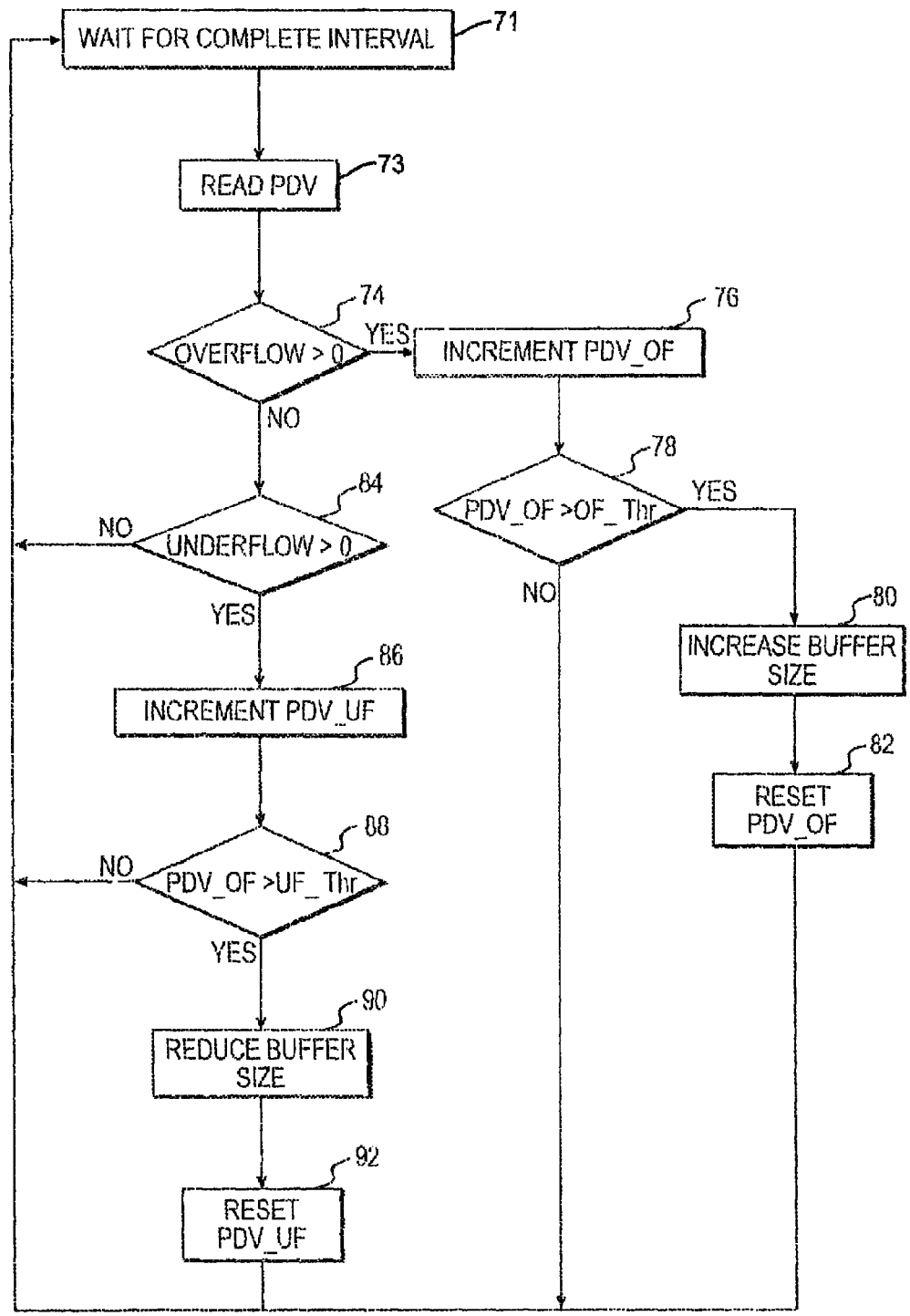
FIG. 18 is a flow chart showing operation of packet delay variation measurement and system reaction.

FIG. 18 shows a flow chart for measuring packet delay variation. As previously mentioned, packets arriving faster than the current system is set up to process them can result in loss of data. Conversely, packets arriving too slowly may result in gaps in the data, noticeable as pauses during voice conversations.

A complete packet interval needed to fill the Packet Delay Variation (PDV) hardware buffer, described earlier, is awaited (step 71). The number of events of overflow and underflow in the PDV buffer is then read (step 73) and if there is any overflow (OverFlow>0, step 74), value of the overflow variable is incremented (step 76). The PDV_OF. value is then compared with a predetermined overflow threshold value (PDV_OF>OF_Thr, step 78). If the PDV_OF. value exceeds that of OF_Thr, the PDV_OF. variable is reset to zero (step 82).

The PDV overflow threshold has not been exceeded (step 78), a new packet interval time slot is awaited (step 71) and the steps are repeated.

With continuing reference to FIG. 18, no overflow is detected (step 74) the packet underflow count is compared to zero (step 84). If the count does not exceed zero, a new packet interval branches back to step 71 and a time slot is awaited. On the other hand, if the underflow count is greater than zero, the underflow variable PDF_UF is incremented (step 86). Program step 88 is a logic step which compares the underflow variable from step 86 to a predetermined underflow threshold (UF_Thr). If PDV_UF is greater than UF_Thr, the buffer size is reduced at step 90 and the PDV_UF variable is reset to zero in step 92. If PDV_UF is less than UF_Thr, at logical step 88, the program branches back to step 71 to await the next packet interval. Upon resetting in step 92, the program also branches back to step 71.

Figure 19:
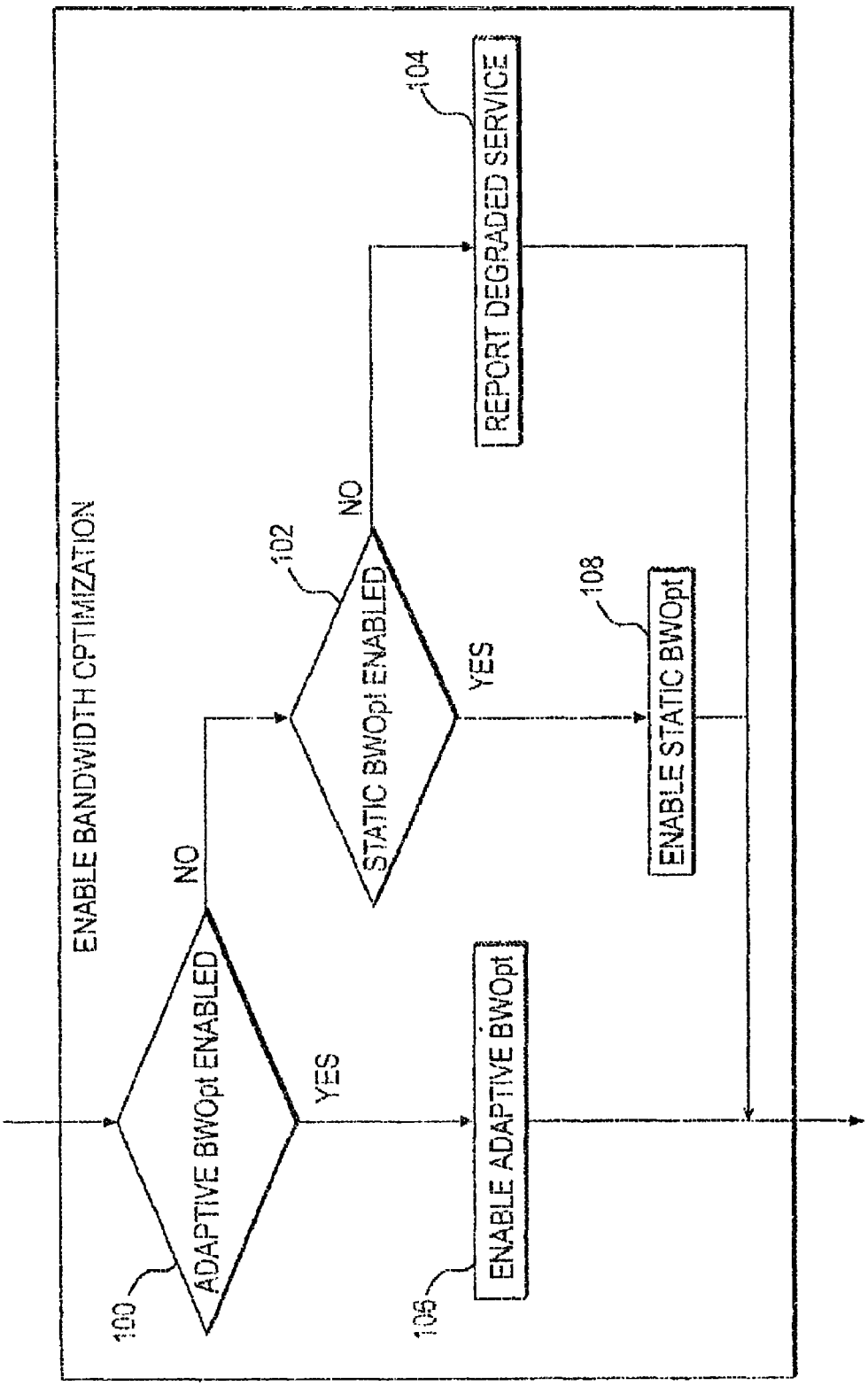
FIG. 19 is a flow chart diagram showing implementation of bandwidth optimization.

FIG. 19 illustrates a flow chart showing implementation of bandwidth optimization. An indication from the program that bandwidth optimization is to be implemented, such as the enable bandwidth optimization program command 70 shown in FIG. 17 initiates the process.

If adaptive bandwidth optimization is not to be enabled, a decision is made whether or not to enable static bandwidth optimization (step 102). If no, a degraded network condition is reported to the user (step 104). If Static BwOpt is enabled (step 102), static bandwidth optimization is enabled (step 108). If adaptive bandwidth optimization is to be enabled (step 100), the program (Adaptive BWOpt enabled).

Therefore, it is intended that this invention not be limited to the particular implementation and method disclosed herein, but that the invention include all implementations falling within the scope of the appended claims.

Adaptation mechanism systems and methods consistent with the present invention reduce the amount of bandwidth required to transmit voice data in a network. Because transmission is limited to active channels, the bandwidth is utilized in an efficient manner regardless of the number of physical cards present on the network.

While there has been illustrated and described what are at present considered to be a preferred implementation and method of the present invention, it will be understood by those skilled in the art that various changes and modifications may be made, and equivalents may be substituted for elements thereof without departing from the true scope of the invention.

Modifications may be made to adapt a particular element, technique, or implementation to the teachings of the present invention without departing from the spirit of the invention.

For example, present invention can be implemented in architecture other than centralized, master/slave configuration. More than one PBX can be provided, such as in a distributed PBX environment with multiple cabinets performing at least one of the function of the centralized master cabinet. Back-up cabinets could also be provided to prevent communication disruption in the event of a breakdown of a primary cabinet.

In addition, the system and method of the present invention could be implemented as part of a Meridian-1 system manufactured by Nortel Networks and include Option 11C cabinets. Also, the foregoing description is based on a client-server architecture.

Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet; or other forms of RAM or ROM.

Also, the foregoing description is based on a client-server architecture, but those skilled in the art will recognize that a peer-to-peer architecture may be used consistent with the invention. Moreover, although the described implementation includes hardware and software, the invention may be implemented only in hardware or only in software.

Therefore, it is intended that this invention not be limited to the particular implementation and method disclosed herein, but that the invention include all implementations falling within the scope of the appended claims.

What is claimed is:

1. A method of dynamically adapting a PBX network to maintain a Quality of Service level in the network comprising:
  identifying a parameter associated with a data packet transported across the network;
  measuring the parameter after the data packet is transported across the network; and
  enabling bandwidth optimization of the network bandwidth when said measured parameter differs from a predetermined value, wherein enabling bandwidth optimization includes reconfiguring a switching matrix within the network.

2. An apparatus for dynamically adapting a PBX network to maintain a Quality of Service level in the network comprising:
  first and second PBX cabinets interconnected in a local area network configuration for sending and receiving data packets;
  a register in connection with at least one of said cabinets for storing a value associated with one or more packets transported across the network;
  a comparator for comparing said stored value with a predetermined value; and
  an optimization mechanism for adjusting the bandwidth of the network when said stored value differs from a predetermined value, and wherein adjusting the bandwidth includes reconfiguring a switching matrix within the PBX network.

3. A method of dynamically adapting a PBX network to maintain a Quality of Service level in the network comprising as set forth in claim 1, wherein said parameter comprises a sequence number associated with the payload portion of said data packet.

4. A method of dynamically adapting a PBX network to maintain a Quality of Service level in the network comprising as set forth in claim 1, wherein said parameter comprises measurement of the difference in arrival times of packets sent across the network and back between a first packet and a second packet.

5. A method of dynamically adapting a PBX network to maintain a Quality of Service level in the network comprising as set forth in claim 1, wherein said parameter comprises measurement of the difference in arrival times of packets sent across the network and back between the average value of arrival times of a group of packets and a second packet.

6. A method of dynamically adapting a PBX network to maintain a Quality of Service level in the network comprising as set forth in claim 3, further comprising storing the sequence number of data packets in a register.

7. A method of dynamically adapting a PBX network to maintain a Quality of Service level in the network comprising as set forth in claim k further comprising storing sequence numbers associated with successive data packets in the register.

8. A method of dynamically adapting a PBX network to maintain a Quality of Service level in the network comprising as set forth in claim 7 further comprising monitoring the sequence of sequence numbers associated with successive data packets stored.

9. A method of dynamically adapting a PBX network to maintain a Quality of Service level in the network comprising as set forth in claim 8, further comprising:
   incrementing a counter in the register by a count of one when the sequence numbers of successive data packets stored are in sequential order; and
   incrementing the counter by a count greater than one when the sequence numbers of successive data packets stored are out of sequential order.

10. A method of dynamically adapting a PBX network to maintain a Quality of Service level in the network comprising as set forth in claim 9, further comprising initiating bandwidth optimization when said counter count is incremented by a count greater than one.

11. A method of dynamically adapting a PBX network to maintain a Quality of Service level in the network comprising as set forth in claim 10, wherein said bandwidth optimization comprises static optimization.

12. A method of dynamically adapting a PBX network to maintain a Quality of Service level in the network comprising as set forth in claim 11, wherein said static optimization comprises limiting the number of channels available on the network.

13. A method of dynamically adapting a PBX network to maintain a Quality of Service level in the network comprising as set forth in claim 10, wherein said bandwidth optimization comprises adaptive optimization.

14. A method of dynamically adapting a PBX network to maintain a Quality of Service level in the network comprising as set forth in claim 13, wherein said adaptive optimization comprises the step of determining which channels are physically represented by cards connected to a PBX network cabinet.

15. A method of dynamically adapting a PBX network to maintain a Quality of Service level in the network comprising as set forth in claim 13, wherein said adaptive optimization comprises the step of determining whether a channel is inactive and re-mapping an active channel to an available inactive one.

16. An apparatus for dynamically adapting a PBX network to maintain a Quality of Service level in the network comprising:
   a parameter identifying mechanism for identifying a parameter associated with a data packet transported across the network;
   a parameter measuring device for measuring the parameter after the data packet is transported across the network; and
   an optimization enabling device for optimizing the bandwidth of the network when said measured parameter differs from a predetermined value, and wherein optimizing the bandwidth includes reconfiguring a switching matrix within the network.

17. An apparatus for dynamically adapting a PBX network to maintain a Quality of Service level in the network as set forth in claim 16, wherein said parameter comprises a sequence number associated with the payload portion of said data packet.

18. An apparatus for dynamically adapting a PBX network to maintain a Quality of Service level in the network as set forth in claim 16, wherein said parameter is derived from measurement of the difference in arrival times of packets set across the network and back between a first packet and a second packet.

19. An apparatus for dynamically adapting a PBX network to maintain Quality of Service level in the network as set forth in claim 16, wherein said parameter is derived from measurement of the difference in arrival times of packets sent across the network and back between the average value of arrival times of a group of packets and a second packet.

20. An apparatus for dynamically adapting a PBX network to maintain a Quality of Service level in a network as set forth in claim 17, wherein sequence numbers of the data packets are stored together in a register.

21. An apparatus for dynamically adapting a PBX network to maintain a Quality of Service level in a network as set forth in claim 20 wherein sequence numbers associated with successive data packets are stored in the register.

22. An apparatus for dynamically adapting a PBX network to maintain a Quality of Service level in the network as set forth in claim 21 wherein the sequence of sequence numbers associated with stored successive data packets is monitored.

23. An apparatus for dynamically adapting a PBX network to maintain a Quality of Service level in the network comprising as set forth in claim 22 wherein:
   a counter in the register is incremented by a count of one when the sequence numbers of successive data packets stored are in sequential order; and
   the counter is incremented by a count greater than one when the sequence numbers of successive data packets are stored are out of sequential order.

24. An apparatus for dynamically adapting a PBX network to maintain a Quality of Service level in the network as set forth in claim 23, wherein bandwidth optimization is initiated when the counter count is incremented by a count greater than one.

25. An apparatus for dynamically adapting a PBX network to maintain a Quality of Service level in the network as set forth in claim 24, wherein bandwidth optimization comprises static optimization.

26. An apparatus for dynamically adapting a PBX network to maintain a Quality of Service level in the network as set forth in claim 25, wherein static optimization comprises limiting the number of channels available on the network.

27. An apparatus for dynamically adapting a PBX network to maintain a Quality of Service level in the network as set forth in claim 24, wherein:
   bandwidth optimization comprises adaptive optimization.

28. An apparatus for dynamically adapting a PBX network to maintain a Quality of Service level in the network as set forth in claim 25, further comprising:
   adaptive optimization apparatus which determines which channels are physically represented by cards connected to a PBX network cabinet.

29. An apparatus for dynamically adapting a PBX network to maintain a Quality of Service level in the network comprising as set forth in claim 25, wherein adaptive optimization determines whether a channel is inactive and re-maps an active channel to an available inactive one.

30. An apparatus for dynamically adapting a PBX network to maintain Quality of Service level in the network comprising as set forth in claim 2, wherein said value comprises measurement of the difference in arrival times of packets sent across the network and back between a first packet and a second packet.

* * * * *

UNITED STATES PATENT AND TRADEMARK OFFICE
CERTIFICATE OF CORRECTION

| | | |
|---|---|---|
| PATENT NO. | : 7,990,882 B1 | Page 1 of 1 |
| APPLICATION NO. | : 09/475269 | |
| DATED | : August 2, 2011 | |
| INVENTOR(S) | : Ayman Bedair et al. | |

It is certified that error appears in the above-identified patent and that said Letters Patent is hereby corrected as shown below:

Claim 7, at column 19, line 1, change "k" to --6--.

Signed and Sealed this
Twenty-seventh Day of September, 2011

David J. Kappos
*Director of the United States Patent and Trademark Office*